United States Patent [19]

Edwards et al.

[11] 4,091,116

[45] May 23, 1978

[54] ADJUSTING THE PROPORTION OF A SUBSTANCE BY ENZYME TREATMENT

[76] Inventors: Ronald Alexander Nixon Edwards, 56 Saunders Bay Road, Caringbah; Peter Morris Cantrell, 722 Anzac Parade, Kensington; John James Miller, 2 Paradise Avenue, Roseville, all of New South Wales, Australia

[21] Appl. No.: 739,746

[22] Filed: Nov. 8, 1976

Related U.S. Application Data

[63] Continuation of Ser. No. 590,588, Jun. 26, 1975, abandoned, which is a continuation of Ser. No. 428,802, Dec. 29, 1973, abandoned.

[30] Foreign Application Priority Data

Jan. 17, 1973   Australia ............................... 1940/73

[51] Int. Cl.² ................................................ A23C 9/12
[52] U.S. Cl. .................................... 426/42; 195/31 R; 195/105; 195/117; 195/119; 426/491
[58] Field of Search .................... 426/34, 41, 42, 491; 195/13 R, 31 R, 115, 116, 105, 117, 119

[56] References Cited

U.S. PATENT DOCUMENTS

| | | | |
|---|---|---|---|
| 3,753,725 | 8/1973 | Williams et al. | 195/105 X |
| 3,896,241 | 7/1975 | Malaspina et al. | 426/491 X |

OTHER PUBLICATIONS

Porter, et al., Membrane Ultrafiltration, Chem. Tech., Jan. 1972, (pp. 56–61).

Michaels, A. S., Ultrafiltration, Aicon Corporation, Lexington, Mass. Booklet No. 905, Mar. 1968, (pp. 16–23).

*Primary Examiner*—David M. Naff

[57] ABSTRACT

The proportion of a compound such as lactose in a solution or suspension such as milk using a soluble enzyme such as beta-galactosidase is carried out by removing matter larger than the enzyme in the solution or suspension by filtering with a first filter to produce a filtrate containing the compound, enzymatically converting the compound present in the filtrate, filtering off the enzyme with a second filter and recombining the resultant filtrate with the matter filtered off by the first filter.

2 Claims, 1 Drawing Figure

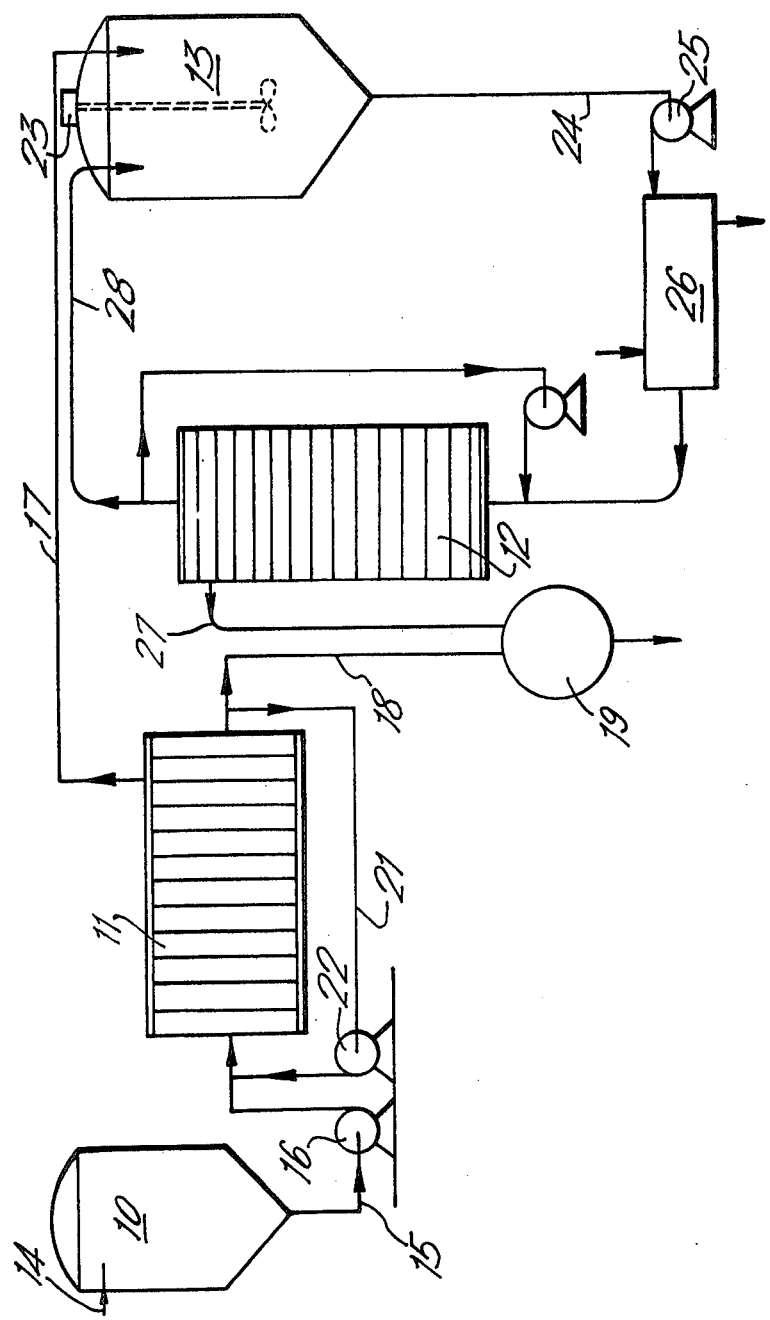

ADJUSTING THE PROPORTION OF A SUBSTANCE BY ENZYME TREATMENT

This is a continuation, of application Ser. No. 590,588, filed June 26, 1975, which in turn is a continuation of Ser. No. 428,802 filed Dec. 29, 1973 both now abandoned.

The present invention relates to a process and apparatus for adjusting the proportion of a compound in a solution or suspension and more particularly to such a process and apparatus utilizing a soluble enzyme.

Enzymes have found increasing use in industry for the purpose of promoting chemical reactions. For reasons of economy, and to avoid contamination of the final product, it is frequently necessary to recover the enzyme used in the process from the liquid in which the reaction has taken place. Conventionally two processes have been used to entrain the enzymes, the first is to insolubulise the enzyme by attachment to an insoluble support and the second is to retain the enzyme in a membrane diffusion bag reactor and to flow the liquid past the bag. The first method has the draw-back that insolubulised enzymes tend to lose activity quite rapidly with time; it has also been found that large areas of enzyme support, or long residence times, are required which adds to the cost of the process. The second method which depends upon diffusion of the reactants and the reaction products across a semipermeable membrane is slow and requires large areas of membrane and is thus unsuitable to commercial use.

The present invention consists in a process for adjusting the proportion of a compound in a solution using a soluble enzyme having a molecular size greater than that of the compound, comprising the steps of filtering from the solution all matter having a size larger than the molecular size of the enzyme in a first filter, adding the enzyme to the first filtrate to achieve the desired enzymatic conversion of the said compound; filtering the enzyme from the solution in a second filter and adding the second filtrate to the matter filtered out by the first filter.

The present invention further consists in apparatus for adjusting the proportion of a compound in a solution using a soluble enzyme having a molecular size greater than that of the said compound, comprising a first filter having a pore size not larger than the molecular size of the enzyme, a reaction vessel for the enzymatic conversion of the substance, a second filter having a pore size smaller than the molecular size of the enzyme and means to combine the filtrate from the second filter with matter filtered out by the first filter.

The present invention has particular applicability to the hydrolysis of lactose in milk, however, it can also be used in numerous other systems such as the adjustment of the glucose content in egg albumen using glucose ozidase or the removal of limonin from citrus juices using limoninase.

It is preferred that the enzymatic material is recycled from the second filter to the reactor in order to maintain a continuous flow of solution from the apparatus. The reactor may be of the plug flow type although other types of reactors, particularly continuous reactors such as back-mix reactors may be used.

It will be appreciated that if the pore size of the two filters is the same, or if the pore size of the second filter is larger than the pore size of the first filter, the final composition of the liquid will be the same as its initial composition, with the exception of the enzymatic conversion of the substrate compound. This process can thus be used to effect the economic conversion of specific substances in a heterogeneous solution or suspension provided that the substance can be enzymatically converted by an enzyme having a larger molecular size than that of the substance. The process is of particular use where it is desired to remove from the solution a compound, other than the substrate compound, which would also be converted by the enzyme or which would deactivate the enzyme. It has been found that the removal of the larger particles or molecules from the solution prior to enzymatic conversion of the substrate compound increases the activity shown by the enzyme.

If desired enzyme may be grafted onto a soluble substrate in order to increase its molecular size and hence the rate at which the reaction solution may be filtered. As used throughout this specification, the term "the molecular size of enzyme" is taken to mean molecular size of the enzyme itself together with any soluble substrate to which it may be grafted.

Hereinafter given by way of example only are preferred examples of the present invention described with reference to the accompanying diagramatic representation of apparatus according to the present invention.

Apparatus for the adjustment of the lactose content of skim milk using $\beta$-galactosidase comprises a feed tank 10, ultrafilters 11 and 12 and an enzyme reactor 13.

Skim milk is fed intermittently into feed tank 10 through line 14 and is fed continuously out along line 15 through pump 16 to the first ultrafilter 11.

Milk passing through ultrafilter 11 is separated into a filtrate consisting of a solution of molecules of a molecular size smaller than that of the enzyme and a concentrate containing larger molecular size molecules. In practice it was found convenient to operate the ultrafilter under conditions wherein 90% of the skim milk comprises the filtrate and 10% is separated off into the concentrate.

The filtrate is passed along line 17 to the enzyme reactor 13 while the concentrate is passed directly through line 18 to an in-line mixer 19 for recombination with enzyme treated filtrate.

In order to facilitate the starting up of the apparatus a recycle line 21 and pump 22 are provided to recycle milk concentrate through the ultrafilter 11.

Line 17 carries the filtrate from ultrafilter 11 to the enzyme reactor 13 which is fitted with an agitator 23. The enzyme $\beta$-glactosidase is added to the filtrate and converts the lactose in the milk filtrate to glucose and galactose. A conversion rate of 90% has been found to be obtainable with short residense times in the reactor.

The reacted milk is carried by line 24 through pump 25 and heat exchanger 26 to the second ultrafilter 12. The heat exchaner 26 is used to maintain the temperature in the enzyme reactor 13 at the temperature which corresponds to the maximum activity of the enzyme present in the reactor.

Ultrafilter 12 separates the reacted milk into a filtrate containing the reacted milk constituents and a concentrate containing the enzyme. The filtrate is carried by line 27 to the in-line mixer 19 for recombination with the milk concentrate produced in the first ultrafilter 11. The enzyme concentrate from the second ultrafilter 12 is returned to the enzyme 13 through line 28.

The lactose adjusted milk contained 19% of its initial lactose content. The residual lactose content can be adjusted in the process by varying the ratio of separation achieved by the first filter, or by adjusting the degree of hydrolysis of the filtrate in the enzyme reactor.

Milk having an adjusted lactose can be fed to persons who are unable to metabolise lactose; a condition common in large areas of Asia and the Middle East. The adjusted milk has considerable use in food processing e.g. lactose tends to precipitate out from frozen dairy products such as ice cream, the use of the milk treated according to this invention alleviates this problem as well as reducing the amount of sucrose which must be added to the product due to the greater sweetening power of glucose and galactose as compared with the original lactose. Baked goods such as buns and cakes have better browning properties when made with lactose adjusted milk.

The apparatus described above can be used to carry out other processes according to the present invention. These examples are

EXAMPLE 1

Adjustment of the glucose content of egg albumen.

Egg albumen normally contains about 0.5% of glucose. When egg albumen is dried to a low moisture content, the glucose will react with amino groups supplied by the major constituent of albumen, the proteins, to form dark coloured polymers which detract from the appearance, solubility and functional characteristics of albumen when used for cooking purposes.

It is customary to remove the glucose from albumen prior to drying. This may be achieved by the present process by using glucose-oxidase as the enzyme, and filters that are of such a pore size so as to retain glucose-oxidase. In this case it is necessary to dilute the albumen with water prior to feeding to the first filter, as albumen viscosity is high and hampers flow through the system.

EXAMPLE 2

Removal of glucose from blood serum prior to drying

Blood is fed to the first filter where red blood cells and molecules larger than glucose-oxidase are removed. The residual serum passes through the filter and the glucose contained in it is converted to gluconic acid by the glucose-oxidase enzyme.

The reasons for removal of glucose from bood are similar to those given in Example 1, i.e. if dried blood is to be used as a feed, or as a microbiological media, it undergoes "browning reaction" if glucose and amino groups are allowed to interact to form coloured polymers.

EXAMPLE 3

Removal of the bitter principle from orange juice

Orange juice that is bitter contains the material limonin which may be broken down and debittered by the enzyme limoninase.

Orange juice is fed to the first filter where insoluble solids and soluble matter of molecular size greater than limoninase are removed. The enzyme limoninase operates on limonin between the two filters. It is not clear what constitutes the breakdown products of limonin, however it has been found that they are smaller than limonin and are non-bitter.

We claim:

1. A process for reducing the proportion of lactose in a composition selected from the group consisting of milk and milk derived solutions using the soluble enzyme $\beta$-galactosidase comprising the steps of filtering in a first filter by ultrafiltration from said composition substantially all matter having a molecular size larger than the enzyme including fat, casein micelles, and whey protein as present in the milk or milk derived solutions, adding the enzyme to the filtrate obtained from the first filter, maintaining the enzyme in contact with the first filtrate for a time sufficient to allow the enzyme to hydrolyse the lactose to a predetermined extent, filtering by ultafiltration the enzyme from the hydrolysed first filtrate in a second filter to produce a second filtrate and recombining the second filtrate with the matter filtered out by the first filter.

2. A process as claimed in claim 1 in which the enzyme filtered out by the second filter is recycled for addition to fresh filtrate from the first filter.

* * * * *